J. W. CLARK.
Rein-Holders.
No. 143,668.  Patented Oct. 14, 1873.
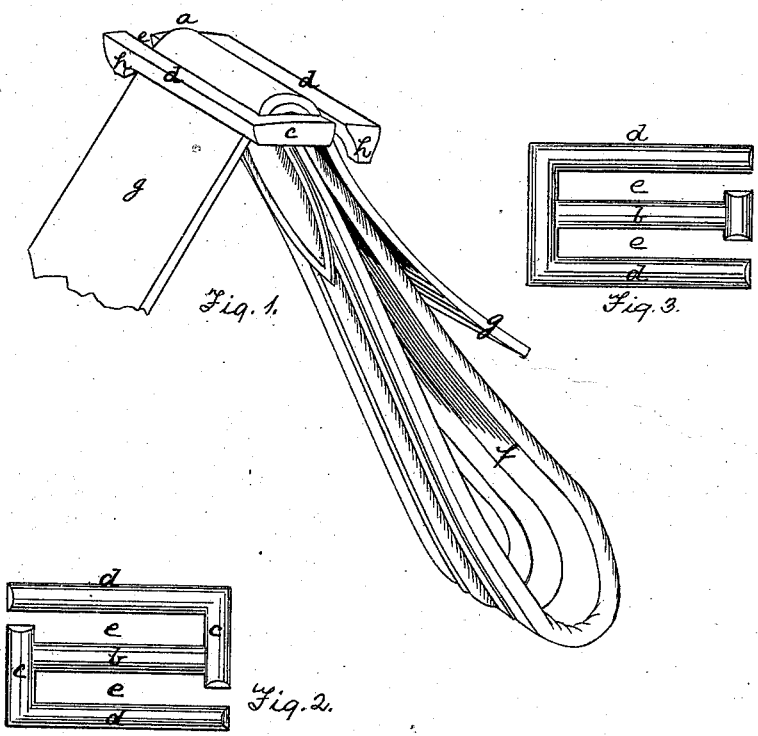
Witnesses
James J. Kay
E. C. Fitler.
Inventor
John W. Clark
by Bakewell, Kerr
his Attys

UNITED STATES PATENT OFFICE.

JOHN W. CLARK, OF PITTSBURG, PENNSYLVANIA.

IMPROVEMENT IN REIN-HOLDERS.

Specification forming part of Letters Patent No. 143,668, dated October 14, 1873; application filed March 31, 1873.

*To all whom it may concern:*

Be it known that I, JOHN W. CLARK, of Pittsburg, in the county of Allegheny and State of Pennsylvania, have invented a new and useful Improvement in Rein-Holder; and I do hereby declare the following to be a full, clear, and exact description thereof, reference being had to the accompanying drawing forming a part of this specification, in which—

Figure 1 is a perspective view of my improved rein-holder, and illustrates the manner in which it is put on the rein. Fig. 2 is a plan view of the frame, and Fig. 3 is a like view of a modified form of the same.

Like letters of reference indicate like parts in each.

The rein-holders heretofore most generally in use have consisted of a square or nearly square plate or frame, having two longitudinal slots for the insertion of the reins, the hand-loop being attached to the bar or cross-piece dividing the two slots.

The great objection to this and all other holders heretofore in use is the difficulty of putting them onto the reins. The slots are entirely inclosed, and the reins have to be unbuckled and drawn through each slot separately, and, as these holders are generally put at about eight feet from the end of the rein, the whole eight feet of each rein has to be drawn through each slot, making it troublesome to put them on.

It is very desirable to make a holder which is easily put on and taken off, so that it can be used when desired, and removed without trouble when not needed. This is the object of my invention; and it consists of a frame or plate composed of three parallel bars, and having two open slots running in from its sides, so that it can be slipped onto the rein, instead of necessitating drawing the rein through it.

To enable others skilled in the art to make and use my invention, I will describe its construction and manner of use.

The frame *a* of the holder is made of any suitable metal, and consists of a center cross-bar, *b*, at each end of which is a short side piece, *c*, running in opposite directions, and each connected with an outer bar, *d*, which is parallel with the center bar *b*, the whole forming an S-shaped frame. The slots *e* extend in from the opposite sides of the frame. The loop or handle *f* is secured to the center bar *b*, and the holder is fastened to the rein *g* by slipping the rein into the front slot *e*, passing it up over the center bar *b*, and slipping it into the other slot; then the rein is in the position shown in Fig. 1. The stops or projections *h* on the outer ends of the bars *d* prevent the rein from coming out of the slots.

The frame *a* may be made by casting, or may be cut out of a flat piece of metal.

The slots *e* may both extend in from one side of the frame, as shown in Fig. 3; but I prefer the first construction, as the frame so made is stronger and less liable to let the rein slip.

The holder thus made is easily put on the rein, and, when not needed, may be as easily taken off.

What I claim as my invention, and desire to secure by Letters Patent, is—

1. The frame *a*, having stops *h* on the outer ends of the outer bars *d* to prevent the rein from slipping out of the slots, substantially as described.

2. The rein-holder, consisting of the frame *a*, with stops *h*, and the hand-loop *f*, substantially as and for the purposes described.

In testimony whereof I, the said JOHN W. CLARK, have hereunto set my hand.

JOHN W. CLARK.

Witnesses:
 A. S. NICHOLSON,
 THOS. B. KERR.